(12) United States Patent
Reutelingsperger et al.

(10) Patent No.: US 10,815,614 B2
(45) Date of Patent: Oct. 27, 2020

(54) METHODS TO MANUFACTURE A TEXTILE PRODUCT

(71) Applicant: DSM IP Assets B.V., Heerlen (NL)

(72) Inventors: Chris Reutelingsperger, Echt (NL); Reinard Jozef Maria Steeman, Echt (NL); Wilhelmus Theodorus Maria Van Roij, Echt (NL)

(73) Assignee: DSM IP ASSETS B.V., Heerlen (NL)

(*) Notice: Subject to any disclaimer, the term of this patent is extended or adjusted under 35 U.S.C. 154(b) by 0 days.

(21) Appl. No.: 15/770,263

(22) PCT Filed: Nov. 4, 2016

(86) PCT No.: PCT/EP2016/076681
§ 371 (c)(1),
(2) Date: Apr. 23, 2018

(87) PCT Pub. No.: WO2017/077041
PCT Pub. Date: May 11, 2017

(65) Prior Publication Data
US 2018/0313031 A1    Nov. 1, 2018

(30) Foreign Application Priority Data

Nov. 5, 2015 (EP) .................................. 15193217

(51) Int. Cl.
*B29C 65/00*    (2006.01)
*B29C 65/20*    (2006.01)
(Continued)

(52) U.S. Cl.
CPC ......... *D06N 7/0065* (2013.01); *D06N 7/0071* (2013.01); *D06N 7/0078* (2013.01);
(Continued)

(58) Field of Classification Search
CPC ......... B29C 65/00; B29C 65/02; B29C 65/18; B29C 65/20; B29C 65/48; B29C 65/4815;
(Continued)

(56) References Cited

U.S. PATENT DOCUMENTS 2,343,351 A * 3/1944 Wedler .................. D06C 29/00
                                                              8/130.1
3,150,024 A * 9/1964 Penman .................. B32B 27/00
                                                              156/229
(Continued)

FOREIGN PATENT DOCUMENTS

DE    3031665 A1 *  4/1982  ............. D06C 11/00
DE    41 22 993        1/1993
(Continued)

OTHER PUBLICATIONS

International Search Report for PCT/EP2016/076681, dated Jan. 23, 2017, 3 pages.
(Continued)

*Primary Examiner* — Philip C Tucker
*Assistant Examiner* — Brian R Slawski
(74) *Attorney, Agent, or Firm* — Nixon & Vanderhye P.C.

(57) ABSTRACT

The present invention pertains to a method to manufacture a textile product comprising a first sheet having a width and a length, and polymer yarns fastened to this sheet to form a pile thereon, the method comprising providing the sheet, stitching the polymer yarns through the sheet to form the pile on a first surface of the sheet and loops of the yarns at a second surface of the sheet, transporting the sheet in a direction parallel to its length along a heating element, the heating element being directed to the second surface of the sheet, heating the second surface with the heating element to at least partly melt the loops of the yarns to fasten the yarns to the sheet, wherein the method comprises transporting the (Continued)

sheet in contact with the heating element, wherein the heating element is a stationary rigid plate-like element having a width corresponding to the width of the sheet, and a length that extends parallel to the length of the sheet, the plate being curved in its length direction, wherein the outer circumference of the plate is contacted with the sheet. The invention also pertains to a method to use a textile product obtained with the new method and a device for applying the said method.

9 Claims, 2 Drawing Sheets (51) Int. Cl.
| | |
|---|---|
| *B29C 65/78* | (2006.01) |
| *D06N 7/00* | (2006.01) |
| *B32B 37/00* | (2006.01) |
| *B32B 5/02* | (2006.01) |
| *B32B 37/04* | (2006.01) |
| *B32B 37/06* | (2006.01) |
| *B32B 38/00* | (2006.01) |
| *B32B 38/18* | (2006.01) |
| *D04H 5/12* | (2012.01) |
| *D05C 15/12* | (2006.01) |
| *D04H 11/00* | (2006.01) |
| *D05C 17/02* | (2006.01) |
| *B29L 31/00* | (2006.01) |

(52) U.S. Cl.
CPC ............ *D06N 7/0081* (2013.01); *B29C 65/20* (2013.01); *B29C 65/7861* (2013.01); *B29C 65/7894* (2013.01); *B29C 66/348* (2013.01); *B29C 66/729* (2013.01); *B29C 66/7392* (2013.01); *B29C 66/914* (2013.01); *B29C 66/95* (2013.01); *B29L 2031/7322* (2013.01); *B32B 5/02* (2013.01); *B32B 37/04* (2013.01); *B32B 37/06* (2013.01); *B32B 38/004* (2013.01); *B32B 38/1866* (2013.01); *B32B 2471/02* (2013.01); *D04H 11/00* (2013.01); *D05C 17/02* (2013.01); *D06N 2201/02* (2013.01); *D06N 2211/06* (2013.01)

(58) Field of Classification Search
CPC ............ B29C 65/7858; B29C 65/7861; B29C 65/7888; B29C 65/7894; B29C 66/00; B29C 66/348; B29C 66/47; B29C 66/474; B29C 66/69; B29C 66/729; B29C 66/7485; B29C 66/90; B29C 66/914; B29C 66/9144; B29C 66/95; D06N 7/0063; D06N 7/0065; D06N 2201/02; D06N 7/0071; D06N 7/0076; B32B 5/02; B32B 5/06; B32B 5/08; B32B 38/0036; B32B 38/004; B32B 38/1866; B32B 38/065; B32B 38/22; B32B 2471/02; B32B 27/12; B32B 5/26; B32B 37/14; B32B 37/16; D04H 11/00; D04H 11/04; D05C 17/02; D05C 17/023; D05C 17/026; B29L 2031/7322
USPC .. 156/60, 64, 72, 91, 92, 93, 148, 184, 191, 156/19, 297, 298, 308.2, 309.6, 324, 349, 156/350, 367, 378, 459, 499; 428/85, 92, 428/95, 96, 97; 356/600; 26/2 R
See application file for complete search history.

(56) References Cited

U.S. PATENT DOCUMENTS

| | | | | |
|---|---|---|---|---|
| 3,962,012 | A * | 6/1976 | Schumacher | B32B 38/1866 156/164 |
| 3,969,780 | A * | 7/1976 | Henderson | D06B 1/08 8/149.1 |
| 4,574,413 | A * | 3/1986 | Otting | D06P 5/2016 118/620 |
| 4,624,878 | A | 11/1986 | Evans et al. | |
| 4,770,917 | A * | 9/1988 | Tochacek | B32B 5/02 428/95 |
| 4,910,062 | A * | 3/1990 | Zinke | A44B 18/0023 428/95 |
| 5,099,553 | A * | 3/1992 | Dischler | D06C 11/00 26/2 R |
| 6,491,977 | B1* | 12/2002 | Doesburg | D06N 3/0095 427/244 |
| 2002/0132084 | A1* | 9/2002 | Fink | B29B 17/00 428/85 |
| 2006/0124010 | A1* | 6/2006 | Gelbart | B41C 1/1083 101/415.1 |
| 2011/0013176 | A1 | 1/2011 | Schwarz et al. | |

FOREIGN PATENT DOCUMENTS

| | | | |
|---|---|---|---|
| EP | 93207 | A1 * 11/1983 | |
| EP | 1 598 476 | 11/2005 | |
| EP | 1 892 332 | 2/2008 | |
| GB | 2225351 | A * 5/1990 | ............ D04H 11/00 |
| WO | 2012/076348 | 6/2012 | |

OTHER PUBLICATIONS

Written Opinion of the ISA for PCT/EP2016/076681, dated Jan. 23, 2017, 8 pages.

* cited by examiner

FIG. 3

METHODS TO MANUFACTURE A TEXTILE PRODUCT

This application is the U.S. national phase of International Application No. PCT/EP2016/076681 filed Nov. 4, 2016, which designated the U.S. and claims priority to EP Patent Application No. 15193217.5 filed Nov. 5, 2015, the entire contents of each of which are hereby incorporated by reference.

GENERAL FIELD OF THE INVENTION

The present invention pertains to a method to manufacture a textile product comprising a first sheet having a width and a length, and polymer yarns fastened to this sheet to form a pile thereon, the method comprising providing the sheet, stitching the polymer yarns through the sheet to form the pile on a first surface of the sheet and loops of the yarns at a second surface of the sheet, transporting the sheet in a direction parallel to its length along a heating element, the heating element being directed to the second surface of the sheet, and heating the second surface with the heating element to at least partly melt the loops of the yarns to fasten the yarns to the sheet. The invention also pertains to a method to use a textile product obtained with the new method and a device for applying the said method.

BACKGROUND ART

EP1598476 (assigned to Klieverik Heli) describes a method for manufacturing a textile product as indicated supra. In particular, the first sheet serves as a primary backing, which after the yarns have been fastened thereto, can act as an intermediate for making a carpet or other textile product, in which method the backing does not use a latex to anchor the yarns in place. The backing comprises a sheet with piles of thermoplastic yarns (also called fibres) stitched through the thickness of the sheet and protruding from its upper surface to form the pile. At the lower surface the yarns extend from the second surface and form loops (i.a. parts of the yarns that extend from the second surface and form a loop either as a result from the stitching process itself or simply due to gravity) to provide for an intermediate anchoring of the yarns to the sheet (the yarns can still be removed easily by applying only a light pulling force by hand). The backing is then fed (loops upwards) along a heated roller surface and its underside is pressed against the roller so the yarns will melt. Klieverik states that after cooling the yarns are firmly anchored to each other and the backing without the need for a latex polymer. One embodiment teaches that a thermoplastic adhesive (such as hot melt adhesive) may be applied additionally as a powder to the underside of the backing so the heated surface melts the yarns and adhesive together to create a good adhesion between the piles, the adhesive and the backing. In another embodiment pressure may be applied after heating (e.g. by a pressure roller) to the backing and piles in a direction perpendicular to the backing surface (i.e. from below) to smear the plasticised yarns together to enhance their mutual adhesion, thus allowing the heated roller to be held at a lower temperature, below that at which the yarns would fuse by heat alone. This method provides the advantage that the intermediate backing can be easily recycled since the yarns and backing sheet can be made from the same polymer. There is no incompatible latex penetrated into the fibre piles. There is also saving in energy and raw material costs compared to prior art methods.

WO 2012/076348 (Niaga) describes a method for manufacturing textile products that even improves the anchor strength of the yarn. In this method the first yarn bearing sheet is pressed against the edge of a heated blade, wherein this blade is stationary to provide an additional mechanical force on the molten yarn material in the longitudinal direction (i.e. a direction parallel to the length of the sheet, also called "machine direction" or "transport direction") which spreads the material of the yarn whilst it is still molten resulting in a stronger bond between the first sheet and the yarn. A research disclosure (RD591084) was also published anonymously on 25 Jun. 2013 describing methods for manufacturing carpets using corresponding methods in combination with polyester hot melt glues.

German Offenlegungsschrift DE 4122993 A1 describes a method (column 4, lines 15-32) wherein the yarns are molten at the back side using a discontinues heating process, wherein the heating element is a heating plate. This plate, which has a width corresponding to the width of the sheet, is pressed step-by-step against the sheet until at each step sufficient heating arrived at to melt and bind the yarns to the sheet.

Evans et al. in U.S. Pat. No. 4,624,878 describe various methods to melt yarns at the back of a weatherstripping product. In a first method a heated roller is used that (corresponding to the Klieverik method) rotates in contact with the product. Alternatively, flexible heated fingers are used, which fingers are stationary (see FIG. 15, elements 130). The product is dragged along these fingers in contact therewith to melt the yarns at the backside of the product.

EP 1 892 332, like Evans, describes a heated roller to melt the yarns at the back by rotating a sheet carrying tufted yarns in contact therewith. Also, EP 1 892 331 discloses a plate as a heating element. It is not described whether this plate is used in contact with the product or whether this plate is used in a discontinuous fashion as shown in the above referred to German Offenlegungsschrift, or in a continues fashion.

OBJECT OF THE INVENTION

It is an object of the invention to provide an improved method to manufacture a textile product.

SUMMARY OF THE INVENTION

In order to meet the object of the invention a method to manufacture a textile product as defined in the GENERAL FIELD OF THE INVENTION section has been devised, wherein the method comprises transporting the sheet in contact with the heating element, wherein the heating element is a stationary rigid plate-like element having a width corresponding to the width of the sheet (not excluding that the plate is constituted out of multiple adjoining sub-elements), and a length that extends parallel to the length of the sheet, the plate being curved in its length direction, wherein the outer circumference of the plate is contacted with the sheet. Along the length of contact between the sheet and the curved plate, the curve is convex with respect to the sheet, i.e. it bulges towards the sheet.

With respect to a heating drum as known from EP1598476, the current plate has the advantage that the total heat capacity of the heating element is much lower. A drum or roller inherently has a larger volume that has to be heated and kept at its working temperature. In practice, small diameter drums are no option since then either the contact length with the product to be heated is too short to obtain sufficient melting of the polymer without burning it. Also, even if it would be possible use a small diameter drum and force the product to travel along 90% of its circumference to provide for sufficient contact length, the primary backing sheet would be mechanically deteriorated by being forced to travel in contact with the drum along its small radius. Although a large heat capacity is advantageous for maintaining a stable working temperature, it is very disadvantageous for a quick start up or adaptation of the heating process. A heating plate offers the advantage of a relatively small heat capacity, which allows for more freedom in operating the manufacturing process.

With respect to a blade as known from WO 2012/076348, a plate has the advantage of being better to maintain at a predetermined temperature, especially at high process speeds. The edge of a blade will simply cool down too much when heat is being extracted at a high travelling speed of the product. Only by choosing a material that is able to conduct heat extremely good, and by overheating the blade at its other end, it might be possible to obtain a sufficient high heat flow towards the edge of the blade. Such a process however is not very stable and difficult to control.

With respect to the heating plate as known from DE 4122993 or EP 1 892 332, the current method has the advantage that the product is continuously transported along the heating element in contact therewith. This provides for a method that is relatively easy to scale-up. Also, it is very difficult to devise a flat plate as known from the art, which plate has a width corresponding to the width of a typical sheet for manufacturing textile products (i.e. 4 metres), and at the same time be able to press that plate with an even pressure over its complete surface to the back of the textile product. In practice, some areas will be treated with a high pressure than others, and hence the melting and pressing process will also vary over the area of the plate. In the method of the present invention, the (continuously convex) curve makes sure the sheet can be evenly contacted with the plate over its entire surface area.

With respect to the heating fingers as known from U.S. Pat. No. 4,624,878, the current plate has the advantage of being able to reach higher contacting forces. Flexible fingers as known in the art cannot be used to calender the surface, only to pass heat. And even the passing of the heat is restricted in the known set-up since the mechanical contact between the fingers and textile product is less intense when compared to the situation wherein a rigid plate is being used. With a rigid plate, the sheet can be transported along the plate using high traction forces to make sure the sheet is contacted with a high force over the area of the plate.

The invention also pertains to the use of a textile product obtainable in line with the above described method to cover a surface of a building or any other artificial or natural construction.

The invention also pertains to a device for use in manufacturing a textile product comprising a first sheet having a width and a length, and polymer yarns fastened to this sheet to form a pile thereon, the yarns being stitched through the sheet to form the pile on a first surface of the sheet and loops of the yarns at a second surface of the sheet, the device comprising a heating element for heating the loops of the yarns at least partly to a temperature above the melting temperature of the polymer, transport means for transporting the sheet in a direction parallel to its length along the heating element in contact therewith, wherein the second surface of the sheet, is directed to the heating element, and wherein the heating element is a stationary rigid plate-like element having a width corresponding to the width of the sheet, and a length that extends parallel to the length of the sheet, the plate being curved in its length direction, the outer circumference of the plate being directed to the sheet.

Definitions

A textile product is a product that comprises textile (i.e. material made mainly of natural or artificial fibres, often referred to as thread or yarn), optionally with other components such as backing layers, carrier layers and/or adhesives. Textile products typically comprise an upper layer of pile attached to a backing (where the raised pile fibres are also denoted as the "nap" of the product), but may also be flat weave. Such products can be of various different constructions such as woven, needle felt, knotted, tufted and/or embroidered, though tufted products are the most common type. The pile may be cut (as in a plush carpet) or form loops (as in a Berber carpet).

A polymer yarn is a yarn in which the yarn forming substance is a natural or synthetic thermoplastic polymer. The most widely used polymer yarns for textile products are polyamide and polyester yarns. Polyamide is mostly either PA6 or PA6,6 and the polyester used is mostly polyethylene terephtalate, generally referred to simply as PET. Typically, the polymers used for yarns have a melting point (Tm) of about 220 to 280° C. and a glass transition temperature (Tg) of about 150 to about 180° C.

A loop of a yarn is a length of this yarn that may be curved away from the basic part of the yarn (not excluding that the loop is longer than the main part itself). For a textile product, the basic part of the yarn is the part that forms the upper, visible part of the product. For example, for a carpet this is the part of the yarns that forms the pile. For clothing, this is the part of the yarn that forms part of the outer surface of the clothing. The loop is the part that extends from the back surface of the product.

A plate-like element is an element that has a width and length, and a thickness that is small compared to its width and length, as opposed for example to a drum or roller wherein the width is the same as its thickness. A plate-like element has two distinct opposing surfaces in its width-, length- and height direction, whereas a roller or drum only has distinct opposing surfaces in its axial direction.

A rigid element is an element that does not macroscopically deform when subject to forces typically applied to this element during its normal use.

A radius of a curved plate is the radius of a circle that best fits the outer circumference of the plate in a continuously convex section of the plate.

A sheet is a substantially two dimensional mass or material, i.e. broad and thin, typically, but not necessarily, rectangular in form, and inherently has two opposite surfaces.

Stitching is a method of mechanically making a yarn part of an object by stitches or as if with stitches, such as by tufting, knitting, sewing, weaving etc.

Calendering is a process of smoothing a surface using pressure and/or heat.

A hot melt adhesive is a thermoplastic adhesive that is designed to be melted, i.e. heated to transform from a solid state into a liquid state to adhere materials after solidification. Hot melt adhesives are typically non-reactive, crystalline and comprise low or no amount of solvents so curing and drying are typically not necessary in order to provide adequate adhesion.

A central processing unit is a hardware system, programmed to process data. The hardware does not need to be one single unit, but may comprise several distributed units operatively connected via for example wireless connections.

EMBODIMENTS OF THE INVENTION

In a first embodiment while the sheet is contacted with the heating element, the pile is left uncompressed for at least half of the contact length between the heating element and the sheet. In other words, the sheet is contacted with the heating element without applying at least for half of the contact length, a force directed against the first surface towards the heating element. In the art it is customary, in order to optimize the heat flow between the heating element and the polymer of the yarns at the back side of the product, to continuously press the sheet carrying the yarns against the heating element, for example using compression rollers or other compression elements. Applicant found that this may be disadvantageous for textile products in which the pile does not have a constant height. This is for example the case with many carpets, rugs and mats. Given the difference in pile height, compression might lead to differences in heat flow towards the loops of the yarns, and thus, to different molting and spreading processes, leading on its turn to an inhomogeneous textile product. In order for the method to be used freely also for such textile products, it is found to be better to defer, at least for half of the contact length of any compression means on the first side of the sheet. Preferably, no compression means are used for more than 60%, 70%, 80%, 90%, 91%, 92%, 93%, 94%, 95%, 96%, 97%, 98%, 99% up to 100% of the contact length between the sheet and the heating element.

In a second embodiment of the invention, a radius of the curved plate is between 0.1 and 10 meters. It is found that if the radius is below 0.1 meters, there might be too much deformation of the sheet. A radius above 10 meters is also not preferred since at such a large radius, in particular when the product has a width larger than 1 meters, in particular around 4 meters, there is a substantial risk that the contact between the heating element and the product will be lost at some locations (cf. a rubber transport belt being transported over a flat surface: the rubber belt may "bounce" on the surface and temporarily lose its contact at certain sites). This will lead to an uneven heating and hence, uneven melting of the loops of the yarns. This on its turn may lead to uneven binding of the yarns and/or uneven processing and durability properties of the ultimate textile product. The radius may take the value of 0.10, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.55, 0.60, 0.65, 0.70, 0.75, 0.80, 0.85, 0.90, 0.95, 1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, 5.0, 5.5, 6.0, 6.5, 7.0, 7.5, 8.0, 8.5, 9.0, 9.5 or 10.0 meters. In an embodiment a radius of the curved plate is between 0.2 and 2 meters.

In another embodiment the contact length between the sheet and the curved plate is variable. By having available in the method a variable contact length between the curved plate and the sheet, it is very easy to substantially control the heating and melting process. Although varying the temperature of the plate is also an option, to change the temperature of a plate requires time due to the inherent heat capacity of the plate. To enable an instant change in the heating process, the contact length is made variable. This can be embodied in various ways, for example by using displaceable guides for the sheet adjacent the curved plate, such as rollers or wedges, in order to increase or decrease the contact length between the sheet and the plate, or by changing the orientation of the plate in the transport path of the sheet to increase or decrease the contact length between the sheet and plate.

In still another embodiment the sheet is pressed against the plate in order to improve even heating of the sheet and therewith an even melting of the yarns. For this, a pressure element is used that is contacted with the first surface (pile side) of the sheet, and presses the sheet against the curved plate. In order to allow for even pressure while at the same time minimizing the risk of damaging the pile, it is preferred that the pressure element provides pressure not only over the width of the sheet (i.e. a direction transverse to the process direction of the sheet) but also over the length, i.e. over a 2-dimensional surface area of the sheet. This can for example be accomplished using a belt, for example a belt that travels in conjunction with the sheet, typically at the same surface speed, which belt is guided over guide elements, for example rollers, that can be moved with respect to the curved plate, either towards or away from the plate to vary the pressure with which the belt presses against the sheet.

In yet another embodiment the plate is heated using a warm liquid that is forced to travel in thermal contact with the plate. It was found that a convenient way to keep the plate at a constant temperature, being able to counteract the continuous heat flow towards the polymer material to be melted, despite the fact that a plate inherently has a relatively low heat capacity when compared for example with a heating drum, is by using a liquid that travels along the plate in thermal contact. Not only can the temperature of the liquid be varied, but a more convenient and faster way is to vary the flow rate of the liquid. In a further embodiment wherein the liquid flows through one or more separate canals in thermal contact with the plate the liquid is forced to travel in at least a first and a (separate) second neighbouring canal, wherein the direction of the flow of the liquid in the first canal is opposite to the direction of the flow rate of the liquid in the neighbouring second canal.

In another embodiment, at a section distal of the heating element, the first sheet is transported through a calendering nip. Applicant recognized that although the heating element, next to a melting of the yarns, also provides a mechanical smoothing of the molten material due to the contact between the sheet and the plate, the smoothing action might not always suffice to obtain optimal properties. In particular, depending for example on the type of first sheet (for example a fibrous woven, non-woven, or non-fibrous continuous sheet), the type of polymer (for example polyester, polyamide, polypropylene) and the contact length, a different smoothing action may be obtained. In some case, the obtained smoothing action is not sufficient to reach the required surface texture homogeneity. In such cases, a distal calender nip may be used to obtain this texture homogeneity. In a further embodiment, the temperature of the at least partly molten polymer yarns at the calendering nip is below the melting temperature of the polymer of the yarns, and optionally above the glass transition temperature of the polymer. It is noted that this calendering nip can also be advantageously used in a method to manufacture a textile product as defined in the GENERAL FIELD OF THE INVENTION section, thus, without the rigid curved plate being present, or in any device constituted accordingly (thus without the rigid curved heating plate, but instead, having general heating means to at least partly melt the loops of the yarns).

In an embodiment the method comprises measuring a roughness of the second surface with the at least partly molten loops of the yarns thereon, after the at least partly molten loops have solidified and, if the roughness differs from a predetermined surface roughness, adapting the heating of the second surface with the heating element, in order to obtain a different surface roughness. Applicant recognised that the primary strength of the yarn binding (i.e. the strength of binding the yarns to the first sheet due to the at least partly melting of the yarns at the second surface of this sheet) is not the only determining factor for durability of the textile product. In particular when the product in use is being adhered to a second sheet or other surface, the surface texture of the second surface after the melting of the loops appears to be of significant influence too. In particular the durability of the adherence to a second sheet (or other surface), which durability on its turn has a significant influence on the wear of the textile product, seems to be dependent on the resulting surface texture of the second surface. In the art, this has most probably not been recognised as an important factor since one usually strives for a repeated result in manufacturing. If this leads to the same surface texture for every production run, the influence of the surface texture will not necessarily be recognised. Applicant however recognised that during continuous manufacturing over the years it will hardly be possible to keep all variables that may influence the surface texture due to melting of the polymer yarns exactly constant. Environmental circumstances may change, used materials may change (even batch by batch), process apparatuses may change without being noticed etc. Also, applicant recognised that for each and every application of the textile product a different surface texture may be optimal. With the method according to the current embodiment however all of the above can be taken adequately into account. By measuring the surface roughness (which encompasses measuring a surface roughness indicator or parameter), and comparing this roughness with a predetermined adequate roughness, for example, by checking whether the roughness is within a predetermined range, the process to manufacture the textile product can be adapted instantly to any variable that has an influence on the surface texture, to obtain a product having a different surface roughness, meeting the required properties, in particular, meeting properties required for a durable adherence of the textile product to a second sheet or other surface.

In an embodiment, the manufacturing process of the textile product is adapted by adapting the above described heating of the second surface and/or by adapting the described calendering step. Applicant found that the surface texture is most conveniently altered, if not meeting predetermined specifications, by adapting the heating step itself.

In an embodiment wherein the textile product is laminated textile product, i.e. a laminate (i.e. a structure comprising multiple stacked layers mechanically connected to each other) of the first sheet and a second sheet, after the second surface of the first sheet has been processed according to any of the embodiments as described supra, an adhesive is applied to this second surface to which adhesive the second sheet is adhered. In a further embodiment the adhesive is a hot melt adhesive, for example a hot melt adhesive that comprises at least 50% by weight of a polymer chosen from the group consisting of polyurethane, polycarbonate, polyester, polyamide, poly(ester-amide), polyolefine, mixtures thereof and/or copolymers thereof.

It was recognized that the friction between the sheet and the plate may be an important factor to control. In particular since the sheet may not have an indefinite high tear strength, and since high friction may lead to uncontrolled heat buildup and dissipation into the sheet. The level of friction will become more important for broader sheets, such as sheets at typical broadloom (4 meters and above) width, and at high process speeds (for example above 5 m/min). In order to effectively control friction it was found that it is advantageous to introduce some surface roughness, typically having an Ra value above 1 (μm), preferably above 2, 3, 4, 5, 6, 7, 8, 9 or even above 10 μm. Although expected to be a problem, the introduced roughness does not necessarily negatively influence an even melting of the yarns as long as the roughness is applied such that each part of the second surface will effectively have the same (or about the same) contact length with the plate.

In a further embodiment of the laminated textile product, an intermediate layer is provided between the first sheet and the second sheet wherein the intermediate layer is resilient to allow local deformation of this layer along the second surface of the first sheet or along the surface of the second sheet adjacent to the intermediate layer. This embodiment appears to be suitable to prevent or at least mitigate a common problem of laminated textile products: internal strain in the laminate, in particular due to the influence of moist, temperature or other environmental variables. Internal strain on its turn may lead to various problems. With carpet tiles for example, internal strain may lead to the problem of curl: the edges or corners of the tiles tend to curl up. Curling of edges or corners is a problem since the edges in general to not coincide with an edge of the surface to be covered, and thus, the curled up edges or corners may lead to irregularities in center areas of the covered surface. With broadloom carpet, internal strain may lead to deformation such that interstices are formed at the joint of two sections of carpet. Also, for any laminated textile product, internal strain may lead to bulges and local excessive wear. An important reason for the occurrence of internal strain is that the laminate inherently comprises different layers (note: the term "layer" or "sheet" does not exclude that the layer or sheet is actually constituted out different sub-layers) that need to provide very different properties to the textile product (from now on also called "carpet", not excluding other types of textile products such as upholstery, clothing and wall coverings): the first sheet, also called primary backing, needs to stably bear the pile yarns. The second sheet, also called secondary backing, in general provides dimensional stability to the textile product. For this reason, the structure of the different layers is inherently different. And thus, even when for example the first and second sheet are made of the same material, the occurrence of internal strain due to different deformations by the action of moist and temperature, is inherently present. The problem is even increased when different materials are being used for constituting the sheets, in particular when these materials per se expand and contract differently due to moist and or temperature. For example, typical polymers used for making carpet are polyamide, polyester and polyalkylene. These polymers have totally different deformation characteristics due to moist and temperature. It has now been surprisingly found that this problem can be solved or at least mitigated when using a resilient layer as described here above in between the first and second sheet. Without being bound to theory, it is believed that due to the resilient properties as defined here above, it is provided that each of the sheets may expand or contract ("deform") in the horizontal direction independently of an expansion or contraction of the other sheet, and thus, that no (or only low) internal strain (which may lead to curl or other deformation) may arise. This can be understood as follows: due to the resiliency of the intermediate layer which allows local deformation of the material in this layer along the surface of at least one sheet, the horizontal deformation of (one of) the sheet(s) may now be locally absorbed by the intermediate layer, without mechanical forces being transferred directly from the first sheet to the second sheet or vice versa.

In a further embodiment the intermediate layer is a knitted layer. A knitted layer, although the fibres are in essence endless, appears to be perfectly suitable to allow only local deformation. Like a tubular knitted sock that fits every curve of a foot, a knitted layer can easily deform locally without transferring forces to neighboring areas. A knitted layer for use in the present invention is for example Caliweb®, obtainable from TWE, Emsdetten, Germany.

All of the embodiments of the method according to the invention as elaborated upon here above, are reflected mutatis mutandis in the device according to the invention. In particular, the radius of the curved plate is as indicated here above, the introduced surface roughness of the plate and the additional means to press the sheet against the curved plate. So is the fact that in an embodiment of the device according to the invention the contact length between the sheet and the curved plate is variable. Also, in another embodiment the plate is in thermal contact with at least one canal to allow a heated liquid to flow in thermal contact with the plate. In a further embodiment, in order to even increase the capability of the plate to be evenly heated and kept at a predetermined temperature during the manufacturing process, the plate comprises two separate neighbouring canals that have an opposite direction for the flow of the liquid. The same way, as explained here above, in an embodiment the device comprises, at a section distal of the heating element, a calendering nip. In order to be able and control the process to arrive at a predetermined surface roughness of the second surface, the device in an embodiment comprises a sensor for measuring a roughness of the second surface at a section distal of the heating plate, and a CPU that controls the heating of the sheet based on surface roughness data measured using the sensor.

The invention will now be further explained based on the following figures and examples.

EXAMPLES

FIG. 1

Figure 1:
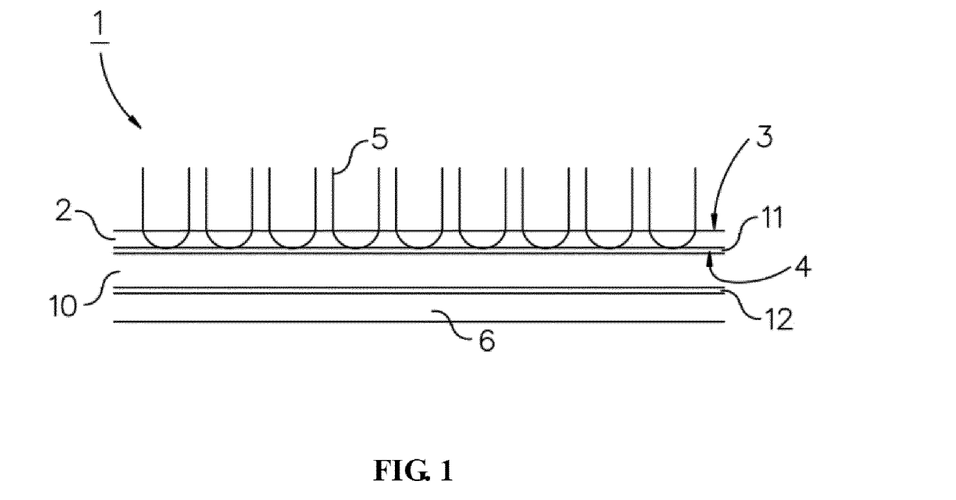
FIG. 1 schematically shows a cross section of a textile product manufactured according to the invention FIG. 2 schematically shows details of a textile manufacturing process according to the invention FIG. 3 schematically represents a laminating configuration

FIG. 1 is a schematic representation of respective layers of an embodiment of a laminated textile product 1 manufactured according to the invention, in this case a carpet tile. The tile comprises a first sheet 2, the so called primary backing, which may be a tufted nonwoven sealed polyester backing. The polyester yarns 5 extend from the first surface 3 of this first sheet and are sealed to the second surface 4 of the sheet using the yarn melting method as described with reference to FIG. 2. The weight of this first sheet is typically about 500-800 g per m². In order to provide mechanical stability, the tile 1 comprises a second sheet 6, in this case a polyester needle felt backing. The weight of this second sheet is typically about 700-900 g/m². In between the first and second sheet is an optional resilient layer 10 (which could for example be a polyester expansion fleece having a weight of 330 g/m², obtainable from TWE, Emsdetten, Germany as Abstandsvliesstof). The three layers (first and second sheet and intermediate layer) are laminated together using a glue, which may be a polyester hot melt glue as obtainable from DSM, Geleen, the Netherlands, applied as layers 11 and 12 at a weight of about 300 g/m².

FIG. 2

Figure 2:
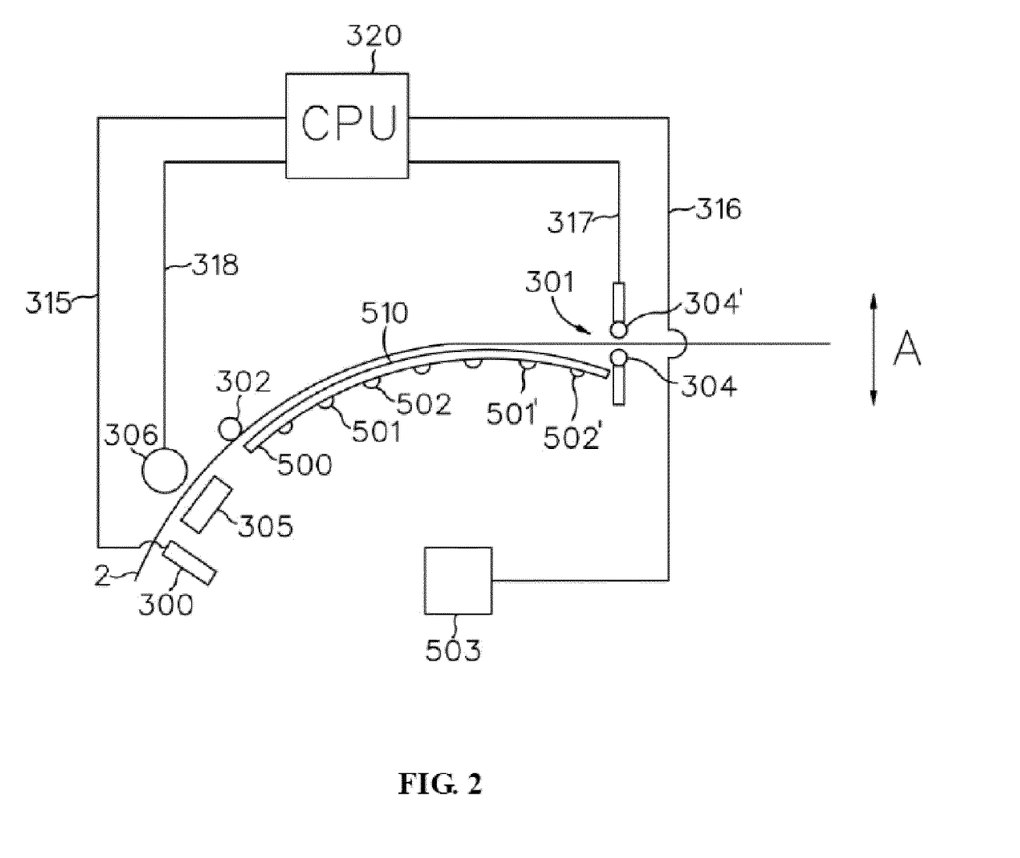

FIG. 2 which schematically shows details of a textile manufacturing process according to the invention. In the configuration shown in FIG. 2 rigid curved heating plate 500 is present. In this embodiment the plate is an aluminium plate having a radius of 0.37 meter, a length of 40 cm and a thickness of 1 cm. The plate is provided with two sided heating by having external canals 501 and 502, which feed a hot oil of 295° C. in opposite directions. The oil is heated in heating bath 503, pumped to the plate and returned to the heating bath 503 after circulation through the volume of the plate (conduits external of the plate towards and from the heating bath are not shown in FIG. 2). The heated outer circumferential (convex) surface 510 of this plate 500 is brought in contact with a product to be processed, of which product the first sheet 2, typically a primary carrier to which yarns are applied via a stitching process such as tufting, is shown. The first sheet is transported face up such that the pile is directed away from the heating plate 500. In operation, the heating plate is stationary and the product is transported relative to the plate in a direction from nip 301 to sensor 300.

The device comprises an entrance nip 301 for the plate, the nip being formed between two rollers 304 and 304'. The nip is displaceable in vertical direction, indicated by double arrow A. This way, the contact length between the plate and the product can be varied. At the lowermost position of the nip, the contact length is at maximum (i.e. the complete length of the curved plate 500), at the highest position of the nip, the contact length is at minimum (in this case one third of the length of the plate 500). At the end of the plate, the sheet 2 is guided by roller 302 towards a calendering nip that consists of cold stationary bar 305 and roller 306. The temperature of the cold bar and roller (which are controlled via CPU 320) is such that the product, in the nip, will have a temperature between the Tg (glass transition temperature) and Tm (melting temperature) of the polymer material of the yarn. This nip can be used to effect an additional calendering action on the textile product, or actually, the back of the textile product.

The position of the entrance nip 301, the heat of the heating bath 503 and the pressure and temperature of the calendering nip (305, 306) are controlled with CPU (central processing unit) 320. This unit controls these various parts using i.a. surface roughness data of the back of the textile product as measured by sensor 300. For this, the sensor is connected to the CPU via line 315. The nip 301, bath 503 and the calendering nip are connected to the CPU via lines 316, 317 and 318 respectively.

The (intermediate) textile product to be processed with the above described configuration may consist of a primary sheet provided with a cut pile of polyester yarns, tufted into the sheet. The yarns typically have a melting temperature of about 260-280° C. This product is processed using a temperature of the heating element 500 of 285-300° C. in order to heat the product. The product, having a width of about 4 meters, corresponding to a width of 4.20 meters of the curved heating element 500, is supplied at a speed 2 metres per minute or higher. Due to the curved constitution, the pressure with which the product is pulled onto the heating element is about is 1.25 Newton per square centimetre. This way, the loops of the yarns at the second surface of the sheet are partly molten and mechanically spread over the second surface to form a semi-continuous layer of molten material that locks the yarns into the first sheet. Depending i.a. on the temperature of the heating elements, the position of the nip 301 and the use of the calendering nip, this will result in a second surface having a more or less smoothed surface with some noticeable surface texture.

Downstream (distal) of the heating blocks, at a section where the molten material will be sufficiently solidified, directed to the second surface of the product 2, is an optical surface roughness measurement sensor 300. With this sensor the 2D surface roughness of the second surface can be measured and data corresponding to this surface roughness are send to CPU 320 via line 315. In this CPU, the actual surface roughness data are compared to predetermined values. If the data match these values, no adaptation of the manufacturing process will follow. If however the data indicate that the roughness is either too small (surface too smooth) or too large (surface too rough), the contact length between the product and the plate may be adapted. Also the heating temperatures of the oil may, the flow rate of the oil through the plate, or the action of the calendering nip may be adapted in order for a next section of product to meet the predetermined surface roughness data.
FIG. 3

Figure 3:
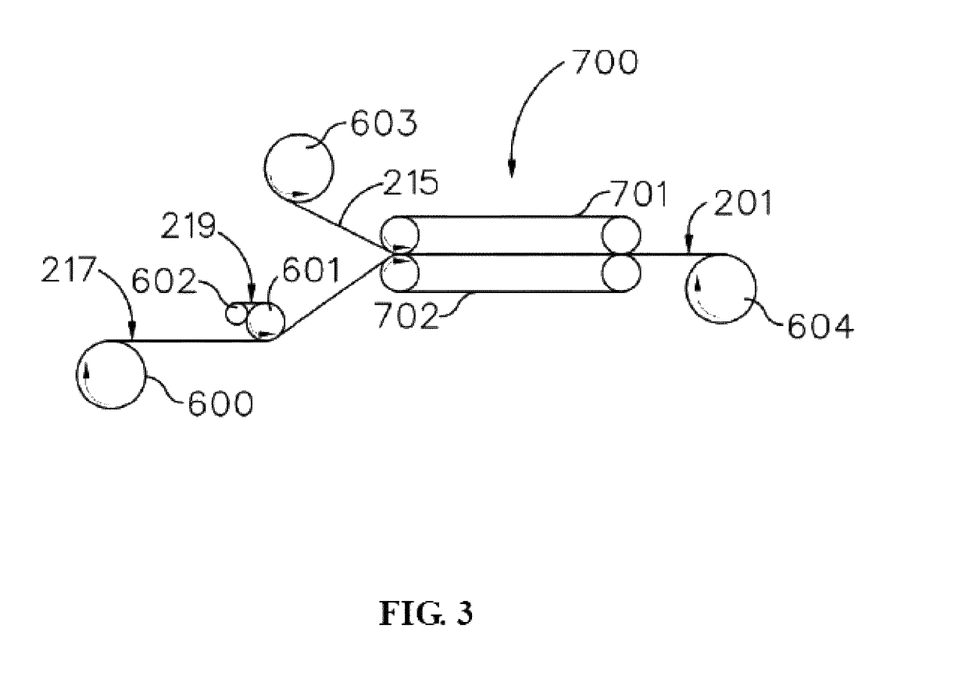

FIG. 3 schematically represents a laminating configuration for applying a second sheet, in this case a dimensionally stable secondary backing sheet, to the back of the first sheet that is produced with a method as described in conjunction with FIG. 2. In this embodiment the term 'target sheet' denotes either the separate resilient layer and second sheet applied one after the other in that order, or the combined laminate of them both applied together to the first sheet. Both the second sheet and the resilient layer may be of polyester. In this figure a first roller 600 is depicted on to which roller is wound a 2 metre wide web of the said (pre-fabricated) product made according to the method described in conjunction with FIG. 2. The product is unwound from the roller 600 to have its back-side 217 to come into contact with a second roller 601. This roller is provided to apply a layer of hot melt adhesive (HMA) 219 to the back side 217. For this, a bulk amount of HMA 219 is present and heated between the rollers 601 and 602. The thickness of this layer can be adjusted by adjusting the gap between these two rollers. Downstream of the section where the HMA is applied is the target sheet 215, which sheet is unwound from roller 603. This sheet is pressed against the hot and tacky adhesive and cooled in the unit 700. This unit consists of two belts 701 and 702 which on the one hand press the target sheet 215 against the primary product (i.e. the first sheet with yarns bound thereto), and on the other hand cools down the adhesive to below its solidification temperature. The resulting end product 201 (corresponding to textile product 1 of FIG. 1) is thereafter wound on roller 604. In an alternative embodiment the fibre-binding process as described in relation with FIG. 2 and the lamination process take place in line. In that case, the fibre-binding set-up as shown in FIG. 2 could be placed between roller 600 and roller 601. In this embodiment the applied HMA is the polyester of Example D as described in the Research Disclosure RD591084 as mentioned herein before. A suitable temperature of the roller 601 at the site where this HMA is applied to the back-side of the primary backing is 140° C. By having a gap of 2 mm, the HMA, at a web speed of 2 m/min, roller 602 not revolving and roller 601 having a circumferential speed of ±1.6 m/min, will be applied with a thickness of about 500 g/m$^2$. This is adequate to glue the target sheet 215 to the primary backing (i.e. the first sheet).

The hot melt adhesive may be optionally provided as a layer having a thickness of less than 1 mm, usefully less than 0.5 mm, more usefully from 0.2 to 0.4 mm. Whereas in the prior art carpets on the market, the hot melt layer typically has a thickness well above 1 mm, applicant found that when reducing the thickness of this layer to 1 mm or below an adequate adhesion can still be obtained. Therefore, the adhesive layer present in textile products of the present invention may have preferred mean thickness of from 50 microns to 1 mm, more preferably from 0.1 mm to 0.8 mm, most preferably from 0.2 mm to 0.4 mm. The amount of HMA used to form the adhesive layer in textile products of the present invention may be from 0.01 to 1000 g/m$^2$ of HMA per area of the adhesive layer. In another embodiment the HMA may be applied in an amount of from 0.05 to 800 g/m$^2$. In a still yet other embodiment HMA may be applied in an amount from 0.1 to 600 g/m$^2$.

The invention claimed is:

1. A method to manufacture a textile product comprising the steps of:
    (a) providing a first sheet having a width and a length, and first and second surfaces,
    (b) stitching polymer yarns through the first sheet to form a pile on the first surface of the first sheet and loops of the yarns at the second surface of the first sheet,
    (c) transporting the first sheet in a direction parallel to the length of the first sheet along a heating element which is directed to the second surface of the first sheet such that the first sheet is in contact with the heating element along a contact length therebetween, wherein the contact length between the first sheet and the heating element is variable, and
    (d) heating the second surface of the first sheet with the heating element to at least partly melt the loops of the yarns to fasten the yarns to the first sheet, wherein the heating element is a stationary rigid plate-like element having a plate width corresponding to the width of the first sheet, and a plate length that extends parallel to the length of the first sheet, the plate-like element being curved in a direction of the plate length, wherein the plate-like element has an outer circumference in contact with the first sheet.

2. The method according to claim 1, wherein step (c) is practiced by maintaining the pile in an uncompressed state for at least one-half of the contact length between the heating element and the first sheet.

3. The method according to claim 1, wherein the curved plate-like element has a radius which is between 0.1 and 10 meters.

4. The method according to claim 1, wherein the curved plate-like element has a radius which is between 0.2 and 2 meters.

5. The method according to claim 1, which comprises heating the plate-like element by a warm liquid in thermal contact with the plate-like element.

6. The method according to claim 5, which comprises:
    (i) causing the liquid to flow through at least one canal in thermal contact with the plate-like element, and
    (ii) forcing the liquid to travel in at least a first and a second canal neighboring the at least one canal such that a direction of the flow of the liquid in the first canal is opposite to a direction of flow of the liquid in the second canal.

7. The method according to claim 1, which further comprises transporting the first sheet through a calendering nip at a section distal of the heating element.

8. The method according to claim 7, which comprises maintaining the at least partly melted polymer yarns at the calendering nip at a temperature which is below a melting temperature of the polymer forming the yarns.

9. A method to manufacture a textile product comprising the steps of:
   (a) providing a first sheet having a width and a length, and first and second surfaces,
   (b) stitching polymer yarns through the first sheet to form a pile on the first surface of the first sheet and loops of the yarns at the second surface of the first sheet,
   (c) transporting the first sheet in a direction parallel to the length of the first sheet along a heating element which is directed to the second surface of the first sheet such that the first sheet is in contact with the heating element along a contact length of therebetween,
   (d) heating the second surface of the first sheet with the heating element to at least partly melt the loops of the yarns to fasten the yarns to the first sheet, and
   (e) measuring roughness of the second surface of the first sheet after the at least partly melted loops of the yarns thereon have solidified and, in response to a measured surface roughness which differs from a predetermined surface roughness, adapting the heating of the second surface with the heating element in order to obtain a different surface roughness, wherein
   the heating element is a stationary rigid plate-like element having a plate width corresponding to the width of the first sheet, and a plate length that extends parallel to the length of the first sheet, the plate-like element being curved in a direction of the plate length, wherein the plate-like element has an outer circumference in contact with the first sheet.

* * * * *